US012573650B2

(12) United States Patent
Wilson et al.

(10) Patent No.: US 12,573,650 B2
(45) Date of Patent: Mar. 10, 2026

(54) METHOD FOR USING FUEL CELL SYSTEM AIR THROTTLE TO CONTROL HYBRID POWER SYSTEM

(71) Applicant: NIMBUS POWER SYSTEMS, INC., Groton, CT (US)

(72) Inventors: Matthew P. Wilson, Groton, CT (US); Michael E. Gorman, Wellesley, MA (US); Samuel J. Angles, Groton, CT (US)

(73) Assignee: NIMBUS POWER SYSTEMS, INC., Groton, CT (US)

( * ) Notice: Subject to any disclaimer, the term of this patent is extended or adjusted under 35 U.S.C. 154(b) by 0 days.

(21) Appl. No.: 18/386,582

(22) Filed: Nov. 2, 2023

(65) Prior Publication Data

US 2024/0194914 A1 Jun. 13, 2024

Related U.S. Application Data

(63) Continuation of application No. 18/077,112, filed on Dec. 7, 2022, now Pat. No. 11,855,322.

(51) Int. Cl.
H01M 8/04858 (2016.01)
H01M 8/04029 (2016.01)
(Continued)

(52) U.S. Cl.
CPC ..... H01M 8/0494 (2013.01); H01M 8/04029 (2013.01); H01M 8/04201 (2013.01);
(Continued)

(58) Field of Classification Search
CPC ........... H01M 8/0494; H01M 8/04029; H01M 8/04201; H01M 8/04604; H01M 8/04656;
(Continued)

(56) References Cited

U.S. PATENT DOCUMENTS 7,638,217 B2 12/2009 Darling et al.
8,795,909 B2 8/2014 Darling et al.
(Continued)

FOREIGN PATENT DOCUMENTS

KR       20080054292 A   6/2008
WO    WO2013/112119 A1   8/2013

*Primary Examiner* — Matthew W Van Oudenaren
(74) *Attorney, Agent, or Firm* — Barry F. Manna

(57) ABSTRACT

A method for operating a fuel cell power plant is provided to deliver power and/or receive power from a load. The fuel cell power plant includes an energy storage system connected in parallel with a fuel cell system. The method for operating includes the steps of calculating and actively proportioning a current split between the fuel cell system and the energy storage system, and controlling the proportioning using fuel cell system air flow. In one embodiment, set point changes in the fuel cell system air flow are operationally independent from a fuel cell water management system that removes product water, humidifies inlet reactant gas, and/or cools the fuel cell stack. In another embodiment, the step of calculating the current split proportion includes the selection of points on a family of V/I curves within a range from 40% fuel cell air utilization to 99% fuel cell air utilization.

13 Claims, 12 Drawing Sheets

(51) Int. Cl.
    *H01M 8/04082*     (2016.01)
    *H01M 8/04537*     (2016.01)
    *H01M 8/04746*     (2016.01)
    *H01M 8/2457*     (2016.01)

(52) U.S. Cl.
    CPC ... *H01M 8/04604* (2013.01); *H01M 8/04656*
    (2013.01); *H01M 8/04753* (2013.01); *H01M*
    *8/0491* (2013.01); *H01M 8/04917* (2013.01);
    *H01M 8/2457* (2016.02)

(58) Field of Classification Search
    CPC ........... H01M 8/04753; H01M 8/0491; H01M
    8/04917; H01M 8/2457; H01M 8/04552;
    H01M 8/04559; H01M 8/04567; H01M
    8/04582; H01M 8/04589; H01M 8/04597;
    H01M 8/04611; H01M 8/04619; H01M
    8/04626; H01M 8/04798; H01M 8/04873;
    H01M 8/0488; H01M 8/04888; H01M
    8/04902; H01M 8/04932; H01M 8/04947;

H01M 2250/20; H01M 2250/10; H01M
16/006
See application file for complete search history.

(56)         References Cited

U.S. PATENT DOCUMENTS

| | | | |
|---|---|---|---|
| 2003/0044658 A1* | 3/2003 | Hochgraf | H01M 16/006 |
| | | | 429/432 |
| 2003/0124410 A1 | 7/2003 | Yi et al. | |
| 2005/0053807 A1* | 3/2005 | Breault | H01M 8/0267 |
| | | | 429/429 |
| 2005/0064261 A1 | 3/2005 | Breault et al. | |
| 2010/0239927 A1* | 9/2010 | Moran | H01M 8/04238 |
| | | | 429/429 |
| 2010/0330448 A1* | 12/2010 | Perry | H01M 8/04753 |
| | | | 429/434 |
| 2011/0111318 A1 | 5/2011 | Bernard et al. | |
| 2014/0295307 A1 | 10/2014 | Toida | |
| 2015/0318565 A1 | 11/2015 | Ryu et al. | |
| 2021/0210777 A1 | 7/2021 | Ito et al. | |

* cited by examiner

METHOD FOR USING FUEL CELL SYSTEM AIR THROTTLE TO CONTROL HYBRID POWER SYSTEM

CROSS-REFERENCE TO RELATED APPLICATIONS

This application is a continuation of U.S. patent application Ser. No. 18/077,112, filed Dec. 7, 2022, which application is incorporated herein in its entirety by reference.

BACKGROUND OF THE INVENTION

This disclosure relates generally to fuel cell power plants and, more specifically, to an improved structure and method of operation that is particularly suited for large, heavy-duty applications.

BRIEF SUMMARY OF THE INVENTION

In accordance with one aspect of the disclosure, a method for operating a hybrid power system includes a step of providing a fuel cell power plant operably connected to an electric load. The fuel cell power plant includes an energy storage system connected in parallel with a fuel cell system. The fuel cell system includes a fuel flow system, an air flow system, a water management system, and a controller operable to manage a power demand of the electric load. The method for operating a hybrid power system further includes the steps of sensing parameters and providing sensed data to a controller, calculating an operational set point responsive to the sensed data to proportion a current split between the fuel cell system and the energy storage system, and controlling the fuel cell air flow system to achieve the set point, thereby actively proportioning current flow between the fuel cell system and the energy storage system.

In one embodiment, the method further includes the step of decoupling the operation and control of the air flow system from the operation and control of the water management system.

In another embodiment, the regulation of the proportion of current flow between the fuel cell system and the energy storage system is carried out in the absence of a DC/DC converter.

In yet another embodiment, fuel cells in the fuel cell system are characterized by a family of V/I performance curves, and the step of calculating an operational set point to proportion a current split between the fuel cell system and the energy storage system includes selecting points on the V/I curve.

In one example, the step of selecting points on the family of V/I curves includes the selection of points within a range from 40% fuel cell air utilization to 99% fuel cell air utilization.

In accordance with another one aspect of the disclosure, a method is provided for operating a fuel cell power plant to deliver power and/or receive power from a load. The fuel cell power plant includes an energy storage system connected in parallel with a fuel cell system. The method includes the steps of calculating and actively proportioning a current split between the fuel cell system and the energy storage system, and controlling the proportioning using fuel cell system air flow.

In one embodiment, set point changes in the fuel cell system air flow are operationally independent from a fuel cell water management system that removes product water, humidifies inlet reactant gas, and/or cools the fuel cell stack.

In another embodiment, the step of calculating the current split proportion includes the selection of points on a family of V/I curves within a range from 40% fuel cell air utilization to 99% fuel cell air utilization.

In yet another embodiment, the step of calculating the current split proportion includes sensing parameters, and providing sensed parameter data to a system controller as input for the calculation.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

DETAILED DESCRIPTION OF THE INVENTION

Figure 1:
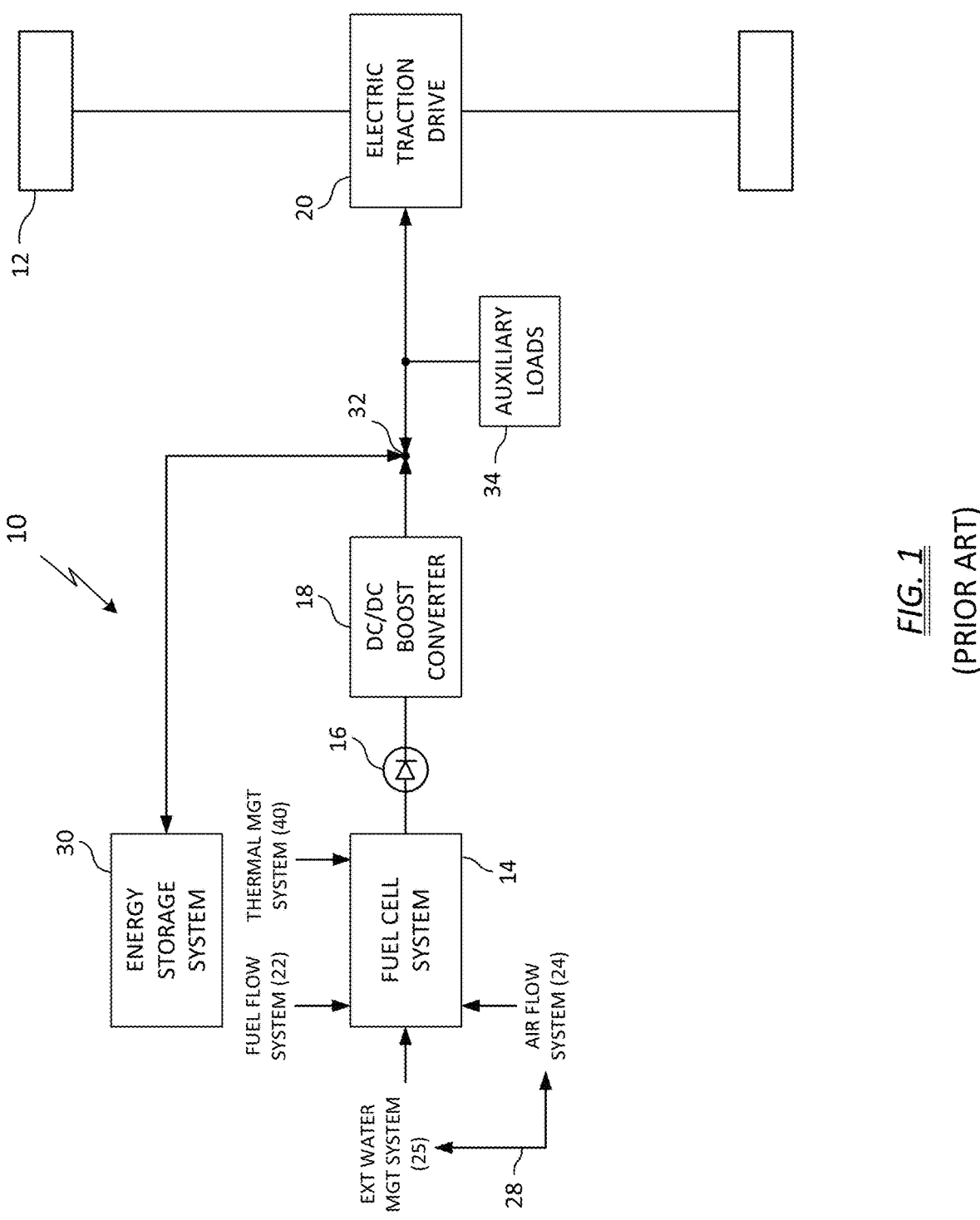
FIG. 1 depicts a block schematic diagram of a prior-art fuel cell power plant in a heavy-duty vehicle.

FIG. 1 schematically depicts a prior-art fuel cell power plant 10 for a vehicle 12, such as a heavy-duty vehicle. The vast majority of fuel cell power plants currently used in light- and heavy-duty applications are similar to this configuration. The power plant 10 includes a fuel cell system 14 comprising a stack of fuel cell plates that, together with associated hardware, supply electrical power, via a diode (or smart gate) 16 and one or more DC/DC boost converters 18, to a load 20, which in the illustrated example is an electric traction drive 20. The traction drive 20 may include a controller for the power conversion process, and a DC-link (capacitor) to buffer the voltage at the junction between the fuel cell power plant 10 and the traction drive inverter.

The fuel cell system 14 includes reactant supply and discharge systems, labeled generally as fuel flow system 22 and air (or oxidizer) flow system 24. In a proton exchange membrane (PEM) fuel cell, hydrogen fuel is supplied to a negative electrode (anode) where it catalytically dissociates into protons and electrons according to the oxidation reaction $H_2 \rightarrow 2H^+ + 2e^-$. The protons ($H^+$) pass through a membrane electrolyte to a positive electrode (cathode) while the electrons ($e^-$) are conducted through an external path creating an electric current between the anode and cathode through an external load. At the cathode the protons and electrons recombine in the presence of oxygen to form water according the reduction reaction: $O_2 + 4e^- + 4H^+ \rightarrow 2H_2O$. The by-products of the PEM fuel cell reaction are water and heat. The heat generated requires that the fuel cell be cooled to maintain an acceptable internal temperature, and the water that is generated must be carefully managed to maintain a proper balance.

Accordingly, the fuel cell system 14 may further include a thermal management system 40 to control the temperature of the cell stack. A coolant such as a water/ethylene glycol mix (WEG) may be circulated through cooler plates in the stack to remove heat.

In the operation of PEM fuel cells, it is critical that proper water management be maintained between a rate at which water is produced at the cathode electrode, including water resulting from proton drag through the PEM electrolyte, and rates at which water is removed from the cathode or supplied to the anode electrode. For PEM fuel cells, if insufficient water is returned to the anode electrode, adjacent portions of the PEM electrolyte dry out, thereby decreasing the rate at which hydrogen ions may be transferred through the PEM and also resulting in cross-over of the reducing fluid leading to local overheating. Similarly, if insufficient water is removed from the cathode, the cathode electrode may become flooded effectively limiting oxidant supply to the cathode and hence decreasing current flow. Additionally, if too much water is removed from the cathode, the PEM may dry out, limiting ability of hydrogen ions to pass through the PEM thus decreasing cell performance.

Accordingly, the fuel cell system 14 further includes an external water management system 25, e.g., outside the cell active area, to humidify the inlet gas(es) via a humidifier which exchanges moisture with the incoming air, and remove product water from the electrochemical reaction via entrainment by reactants through the respective flow fields.

Most fuel cells are constructed with solid reactant flow field plates, which have no internal water management capability (e.g., inside the cell active area), meaning no inlet humidification or product water removal internal to the cell. To prevent the membrane electrode assembly (MEA) from drying out and/or failing, an external means of water management is required, such as an external humidifier. Conversely, to prevent the cathode from flooding, the product water must be continuously blown out of the reactant channels by the air flow system 24. In this manner, the air flow system 24 is said to be coupled to the water management system 25; they cannot operate independently of each other. Water removal is proportional to the air flow through the cell. This coupling is shown schematically in FIG. 1 as a two-way arrow 28.

An energy storage system 30 is also connected to the electric traction drive, in parallel with the fuel cell system 14 and joining at a common junction/DC-link 32 downstream of the DC/DC converter 18. The energy storage system may comprise ultra-capacitors, supercapacitors, batteries, and the like. As noted by the two-way arrows, the storage devices in the energy storage system 30 may supply power to the electric traction drive 20, and may also receive re-charging power from regenerative action of the motor/generators during braking. Although not shown schematically, DC/DC converters may also be used in the energy storage system 30 and the auxiliary load 34.

The DC/DC converter 18 has two primary functions: to boost the fuel cell system voltage to the value required by the high voltage DC-link at the electric traction drive 20, and to control the power split between the energy storage system 30 and the fuel cell system 14. Controlling the power split is important for efficient use of each system; in some operating conditions, such as acceleration, it is advantageous to provide more power from the energy storage system 30 than the fuel cell system 14. The function of the DC/DC converter 18 is to modulate the current from the fuel cell. In operation, the traction drive controller determines the total current needed based upon vehicle demand, and the DC/DC converter modulates the current from the fuel cell system 14 such that, in conjunction with the energy storage system 30, the proper current is delivered to or received from the DC-link. One particular result of this action is that the fuel cell air flow system 24 is generally a feed forward system: a current set point is determined by the vehicle controller or FCS controller and provided to the FCS controller, the FCS controller increases or decreases the air flow, and then the DC/DC converter applies the current.

Although the DC/DC converter 18 can be useful and may be advantageous for passenger vehicle applications, it suffers from drawbacks. In particular, when scaled up to large, heavy-duty vehicles such as Class 8 trucks, the DC/DC converter becomes impractical: it adds too much volume (size), too much weight, it is too costly, and it is not efficient. Preliminary calculations predict approximately 5% of a large vehicle's power output will be lost through DC/DC operation. This is very wasteful. What is needed, therefore, is an alternative to the DC/DC converter so it can be eliminated from the fuel cell power plant.

Objects and embodiments of the present invention accomplish this by controlling the air flow system in the fuel cell to regulate the power split without need for a DC/DC converter. The DC/DC converter voltage boost function may be accomplished by setting the stack cell count and V/I curve to match the DC-link voltage range. Greater detail will be provided below to give further understanding of the system and methods involved.

Figure 2:
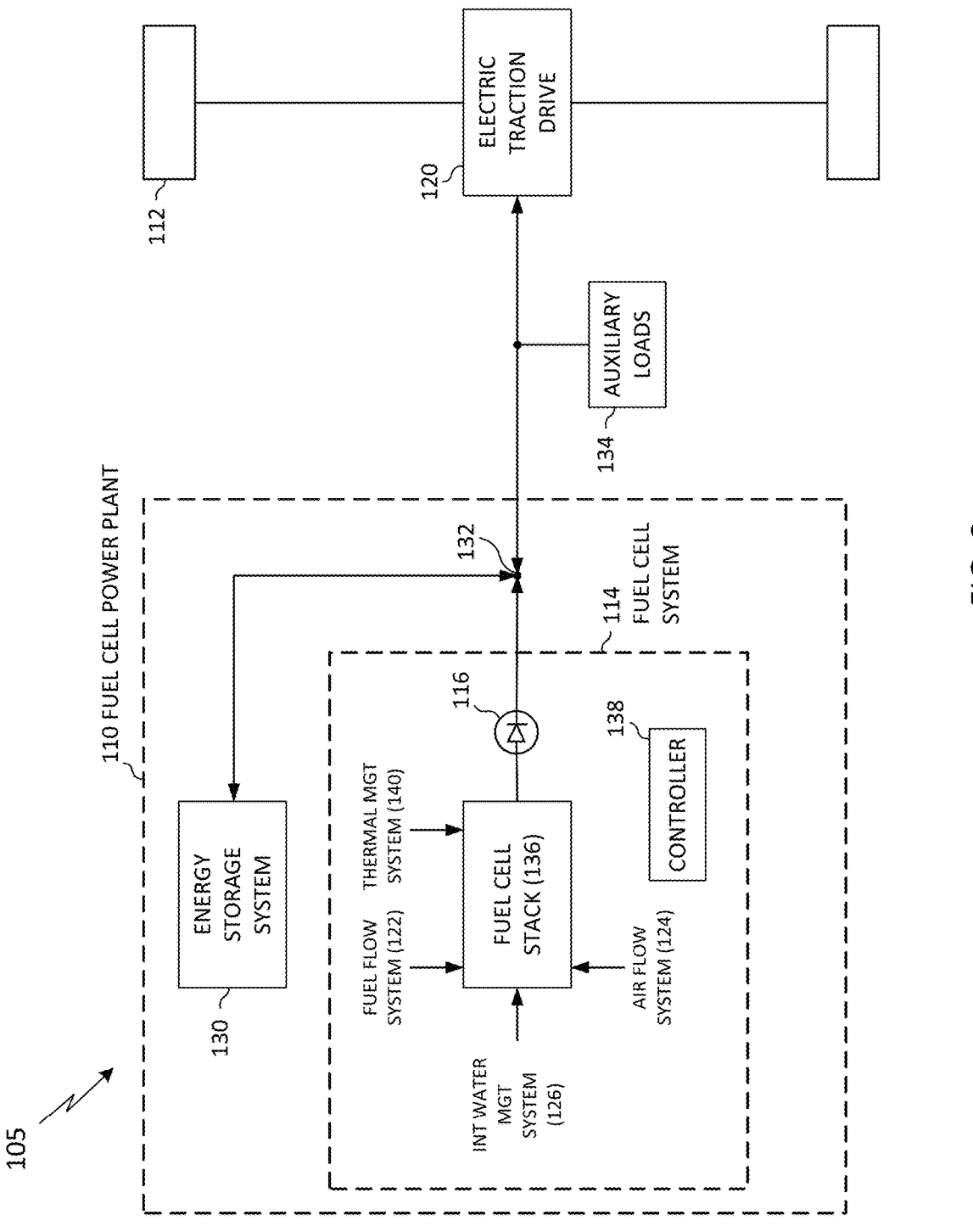
FIG. 2 depicts a block schematic diagram of an exemplary embodiment of a hybrid power system in accordance with the present invention.

Turning to FIG. 2, wherein like numerals indicate like elements in FIG. 1, a hybrid power system 105 includes a fuel cell power plant 110 for a heavy-duty vehicle 112, such as a Class 8 truck, includes a fuel cell system 114 and an energy storage system 130. The energy storage system 130 may be similar or the same as that described with reference to FIG. 1. In one embodiment, the fuel cell system 114 includes a plurality of PEM fuel cells arranged in a stack 136. Each PEM cell is characterized by having at least one porous reactant flow field plate; either on the cathode side, the anode side, or both the cathode and the anode side. In one example, which will be referred to throughout this disclosure, the fuel cell stack includes hybrid bipolar plates as described in commonly owned U.S. Pat. No. 11,424,460 entitled "FOUR-FLUID BIPOLAR PLATE FOR FUEL CELL," which is hereby incorporated herein by reference in its entirety. The bipolar plates are referred to as hybrid because they are formed of both a solid sub-plate and a porous sub-plate. The solid sub-plate may include features found on solid plate fuel cells, and may include an internal coolant passage that is isolated from the other fluids in the cell stack. The internal coolant passage may carry an anti-freeze-type coolant, such as a water/ethylene glycol mix (WEG). The porous sub-plate may include features found on porous bipolar plates, also called water transport plates (WTPs). Porous bipolar plates tightly control pore size to create a bubble barrier that, during fuel cell operation, permits liquid transport through the pores into a liquid water cavity, but prevents reactant gas transport. Liquid transport permits membrane hydration and enables removal of product water on the cathode side resulting from the electrochemical reaction within the fuel cell. Preventing reactant gas transport inhibits the fuel and oxidant gases from escaping into the liquid water cavity.

The fuel cell system 114 includes a fuel flow system 122 to deliver a fuel, such as hydrogen, to the anode flow field plates to be distributed to the anode catalyst layers. In one example, unconsumed fuel flows out an exit, and through a recycle pump back to the fuel inlet. The unconsumed fuel may be periodically purged to cathode exhaust. The fuel cell system 114 further includes an air flow system 124, which may include a blower, a cathode recycle loop with an air system inlet throttle valve to control incoming air, and/or a cathode bypass, to provide the air throttle function. The air flow system is used to control oxidant utilization of the fuel cell stack and to provide oxygen to the cathode flow field plates to be distributed to the cathode catalyst layers.

The fuel cell system 114 may further include a diode or smart gate 116 to prevent current from flowing back to the fuel cell stack. This device allows the fuel cell system voltage to drop below the ESS voltage, and further allows the fuel cell system current to drop to zero, but not go negative, which would cause damage to the fuel cell stack.

The fuel cell system 114 further includes an internal water management system 126 to remove product water from the electrochemical reaction, humidify the inlet gas(es), and/or cool the fuel cell stack. In one possible function, deionized (DI) water can be circulated through water flow fields on the back side of the porous reactant flow field plates. The porous plates provide excellent water management to keep the membrane electrode assembly hydrated by wicking up excess water in flow field channels and migrating it to those areas that are losing water through evaporation. Porous bipolar plates can be exposed to water flow fields to maintain desired operation of the fuel cell. In local regions of the cell in which the reactant gas is flowing from a region of low temperature to higher temperature, water evaporates off the porous plate to saturate the gas stream with water vapor; in regions where the reactant gas is moving from higher temperature to lower temperature, product water that is formed in the electrochemical reaction and liquid water that condenses out of the cooling gas stream can be wicked away by the porous plate. Typically, a pump-driven circulating DI water loop running at a lower pressure than the reactants may be utilized as the driving force to move the water through the pores of the porous reactant flow field plate (i.e., WTP) to remove product water.

The fuel cell system 114 may further include a thermal management system 140 to control the temperature of the cell stack. As mentioned, a coolant may be circulated through cooler plates in the stack to remove heat. The coolant may be isolated from other fluids in the stack (i.e., water, air, hydrogen) to prevent poisoning the MEA. In other examples, water may be circulated through cooler plates in the stack to remove heat.

Figure 3:
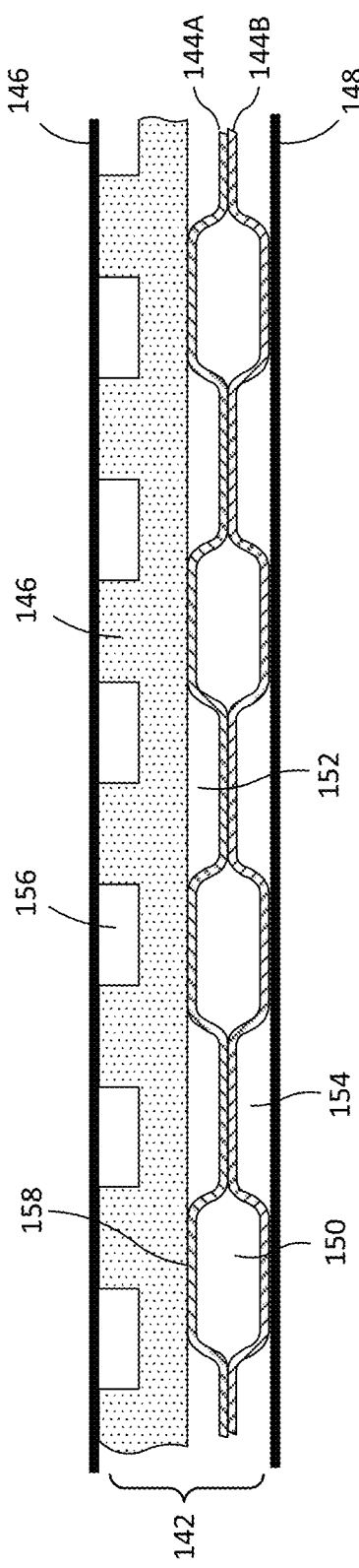
FIG. 3 depicts a section view of a bipolar plate in accordance with one embodiment of the present invention.

FIG. 3 depicts a hybrid bipolar plate 142, as disclosed in commonly-owned U.S. Pat. No. 11,424,460, suitable for use in one embodiment of the present invention. The bipolar plate 142 includes a solid sub-plate 144 and a porous sub-plate 146. The solid sub-plate 144 comprises half-plates 144A and 144B, which may be joined by welding, for example. A membrane electrode assembly (MEA) 148 is interposed between each bipolar plate 142. Thus, the top surface of each MEA 148 would be in contact with fuel flow field channels 154, and the opposing bottom surface of each MEA 148 would be in contact with oxidant flow field channels 156.

Each half-plate may include rows of raised surfaces, and the valleys between them may define fluid flow channels on the external surface of the solid plate. The raised surfaces on one side of the plate define depressions on the opposing side of the same plate. The depressions may define an internal cavity 150 when the two half-plates 144A, 144B are joined together. In one example, the valleys on half-plate 144A define water flow fields 150 for the water management system 126, the valleys on half-plate 144B define fuel flow field channels 154 for the fuel flow system 122, and the internal cavity 150 defines the internal antifreeze coolant passages as part of the thermal management system 140.

The reactant side of the porous sub-plate 146 includes oxidant flow field channels 156 for the air flow system 124, to supply air to the MEA 148. In one example, not illustrated, the channels 156 are transverse to the fuel flow field channels 154. The water management side of the porous sub-plate 146 (i.e., bottom surface) is positioned against the flat raised surfaces 158 of half-plate 144A. In this manner, when demineralized (DI) water is introduced and circulated through the water channels 150, the pores within the porous sub-plate 146 are in fluid communication with the DI water, allowing the DI water to wick through the pores of the sub-plate 146. By carefully controlling the pore size, a bubble barrier is formed to permit liquid transport through the pores but prevent reactant gas transport. Thus, the pores will release DI water to the oxidant flow field channels 156 while preventing oxidant gas from escaping back into the water channels 150.

An important distinction between the inventive fuel cell system 114 disclosed herein and the fuel cell systems 14 in the prior art is that the herein-described air flow system 124 is decoupled from the internal water management system 126. That is, the two systems can operate independent of each other. Notice in FIG. 2 the absence of the couple 28 shown in FIG. 1. Operation of the DI water loop to maintain the proper amount of water in the water flow fields is unaffected by the rate at which air flow is delivered to the cells in the stack. As a result, the stack air flow, and subsequently the power output from the stack, can be varied over a very wide range, and the internal water management system 126 will continue to maintain the proper amount of water in the water flow field. The amount of water in the water flow field is independently maintained because the bubble pressure in the pores of the porous plates causes water to evaporate from the pores when the cell heats up, but the water flow field reservoir on the back side of the plate keeps the pores backfilled. Conversely, when excess water forms from the electrochemical reaction, the bubble pressure in the pores will wick the liquid out of the reactant channel and into the water flow field reservoir. These actions are independent of the air flow.

Figure 4:
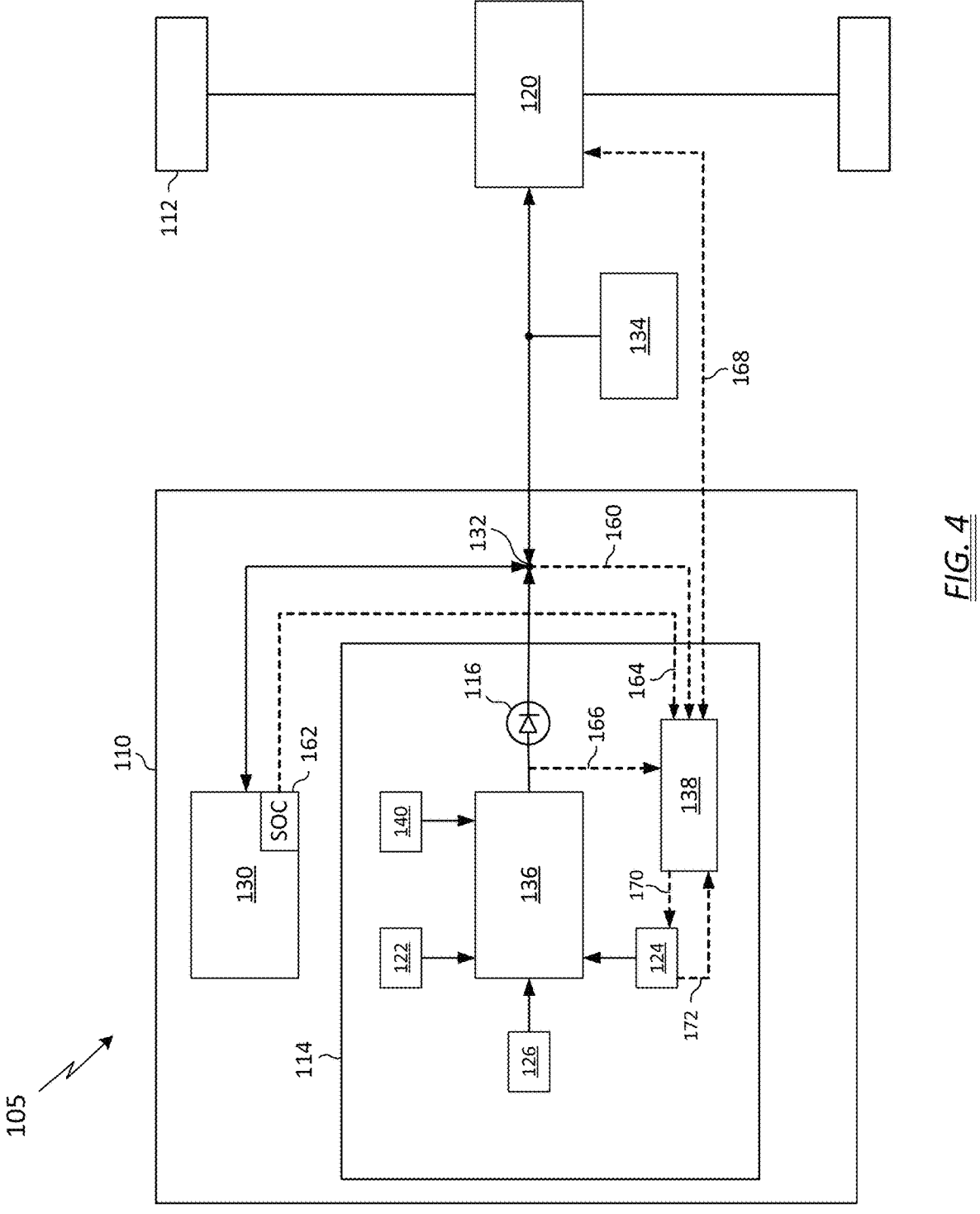
FIG. 4 depicts a block schematic diagram of another exemplary embodiment of a fuel cell power plant in accordance with the present invention.

Referring now to FIG. 4, there is depicted a block schematic diagram of the fuel cell power plant 110 with a controller 138. The controller 138 is depicted as receiving signal inputs from, and delivering control signals to, various portions of the fuel cell power plant 110. Specifically, a signal lead 160 connects the voltage appearing at common electrical junction/DC-link 132 to controller 138 for use by the controller. A state of charge (SOC) sensor 162 monitors the state of charge of the storage devices of the energy storage system 130 and conveys that value to controller 138 via signal lead 164. A signal lead 166 conveys an indication to the controller 138 of the fuel cell system 114, such as output voltage and/or current, cathode exhaust temperature, or cathode exhaust pressure. A signal lead 168 connecting the controller 138 and the load 120, such as an electric traction drive in the illustrated example, is depicted as bi-directional for conveying appropriate drive status, e.g., accelerating or decelerating/braking, and/or control signals between them as may be required. The controller may also receive external environmental data such as ambient temperature and humidity, vehicle route, GPS coordinates, roadway grade, weather forecast, time of day, and driver behavior. In short, the controller 138 may receive any sensed data relevant to controlling the load sharing between the FCS 114 and the ESS 130. The controller 138 delivers a control signal to the air flow system 124 (i.e., the air blower) via signal lead 170, and may receive an air flow rate status signal in return from the blower via signal lead 172.

To determine the set point for power management flow between the energy storage system 130 and the fuel cell system 114, the controller 138 receives signal inputs 168 from the traction drive controller 120 which may include at least the total power demand (both positive and negative) and vehicle speed, and possibly acceleration/deceleration. This information is combined with the state-of-charge (SOC) signal input 162 from the energy storage system 130, and fuel cell system 114 operating data from signal input 160, and run through proprietary algorithms to determine the blower set point 124, which may be optimized for the most efficient use of hydrogen fuel to achieve the power split. For example, vehicle speed informs how much regeneration can be captured at any given moment, so the state of charge can be brought down and maintained at an acceptable lower value.

The controller 138 may calculate a blower speed set point 124, compare it to the current setting from signal input 172, and execute commands via control output 170 to reach a new set point, if any. Operational control of the air flow system 124 thus actively regulates the proportion of current flow between the fuel cell system 114 and the energy storage system 130. Advantageously, no DC/DC boost converter is required, and it may be eliminated from the power plant 110.

To appreciate the breadth of control made possible by using the air flow system 124 to control the power split, attention is directed to FIGS. 5-11, which graphically depict various operating conditions of the disclosed system.

Figure 5:
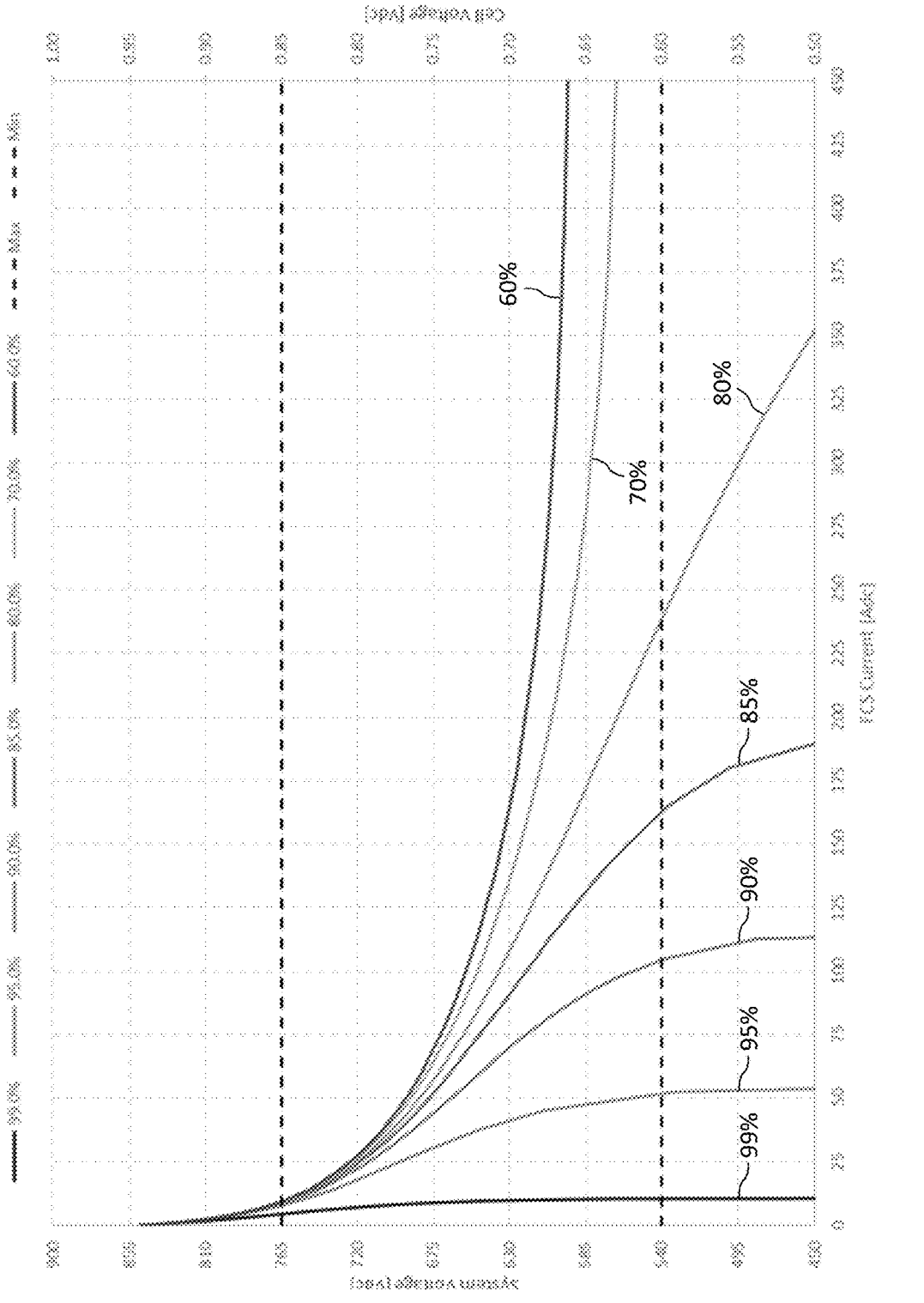
FIG. 5 depicts a family of performance curves for an exemplary fuel cell in accordance with one embodiment of the present invention.

FIG. 5 depicts a family of voltage/current (V/I) curves modeled for a fuel cell system 114 in a heavy-duty vehicle. Shown are performance curves at air utilizations ranging from 60% to 99%. Overlaid on the family of curves are the lower and upper values of the expected voltage range (540V-765V) for the high voltage DC-link in the traction drive 120. Note that air utilizations for some fuel cell systems may extend to 50% or even 40%.

Prior-art fuel cell systems in which air flow control is tightly coupled to water management generally run at 60% air utilization. The constraints on the system restrict off-performance excursions. For example, a solid plate PEM fuel cell system may rely on the air flow system to push excess product water out of the cathode reactant channels. For a given cell operating temperature, water removal is roughly proportional to the air flow through the cell. A control strategy that necessitates blowing entrained water out of the stack to maintain performance does not permit decreasing the air flow by an appreciable amount because it would negatively affect product water removal. Any excursion off nominal 60% would require that the air flow be held to a very narrow range, or else excess product water may accumulate in the channels. Therefore, the air flow (i.e., air utilization) cannot be increased or decreased to any large extent at a given power level.

In contrast, because the air flow system 124 of the present invention is decoupled from the internal water management system 126, the fuel cell system 114 can operate at essentially any of the air utilizations shown in FIG. 5. For example, while the ESS is holding stack voltage constant at 650V, the power output of the stack can safely be varied from about 40 A to 100 A by adjusting the air utilization from about 95% to 60%, respectively, thereby reducing the ESS current while increasing the FCS current.

Figure 6:
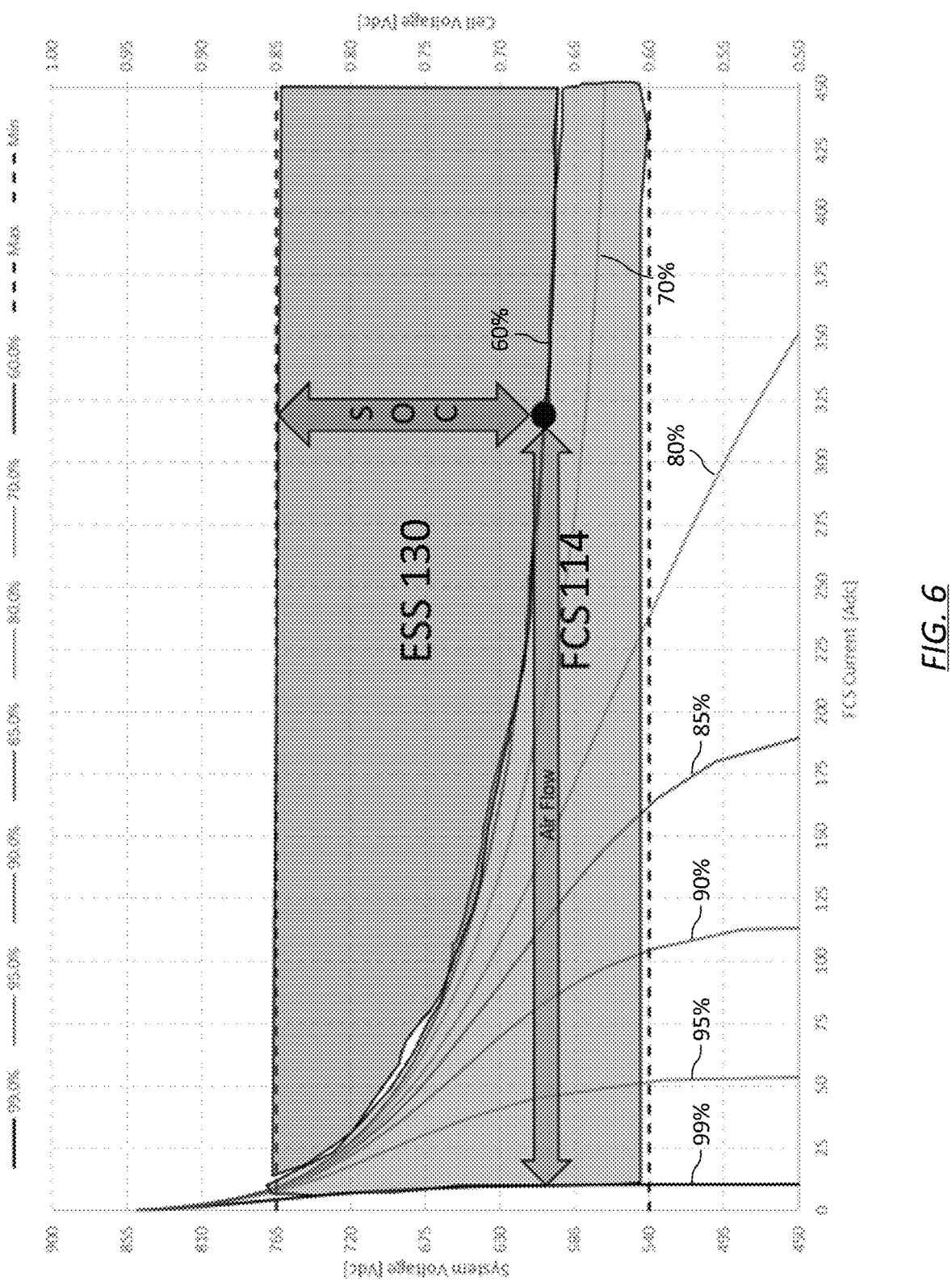
FIG. 6 depicts a performance curve from a family of air utilization curves for a fuel cell power plant in accordance with one embodiment of the present invention.
Figure 7:
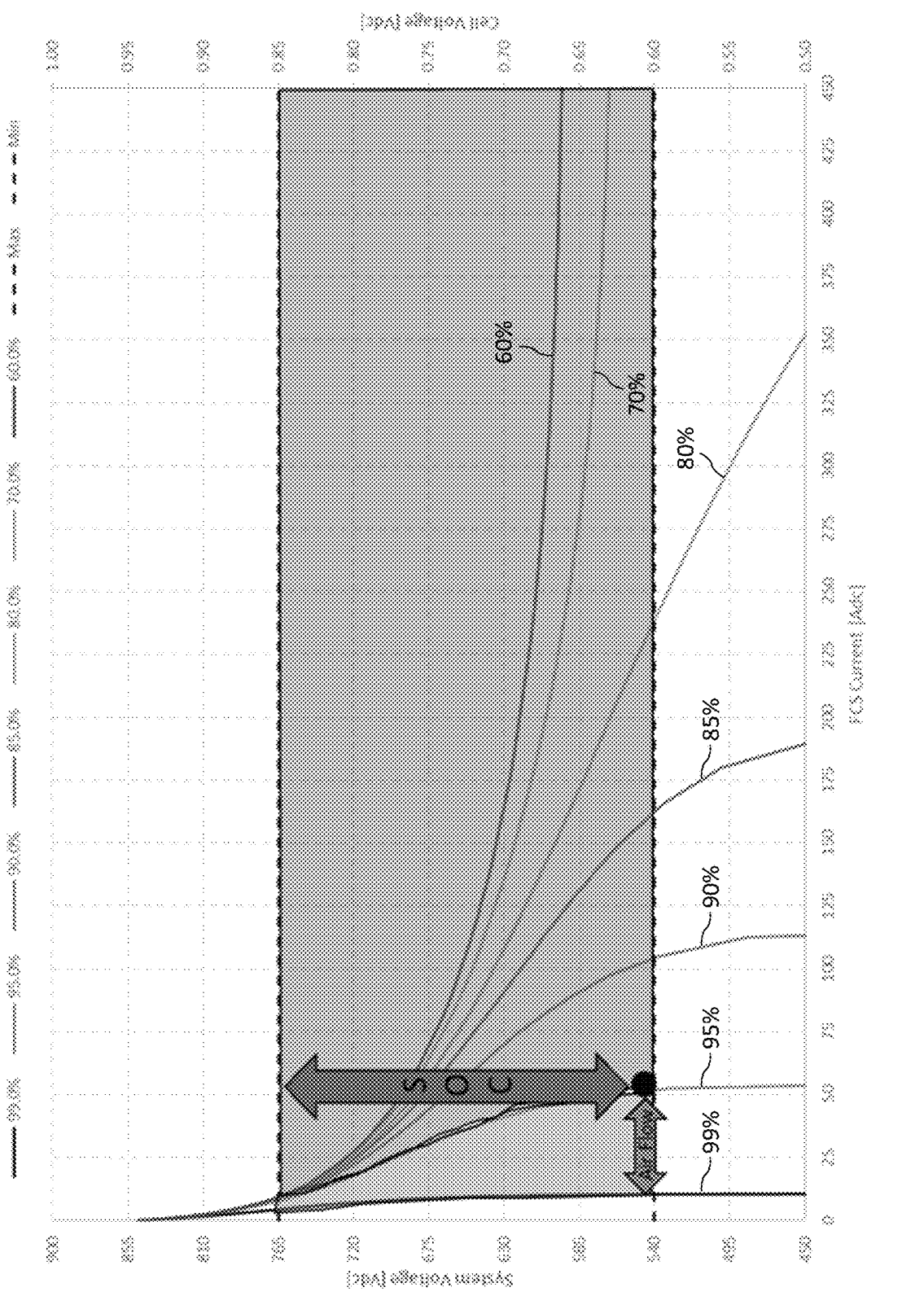
FIG. 7 depicts another performance curve from the family of air utilization curves shown in FIG. 6.

Turning to FIG. 6, shown is the same V/I curve as FIG. 5, overlaid with the operating range of the fuel cell system FCS 114 (at 60% air utilization) and the energy storage system ESS 130. The black dot represents a snapshot of the performance at a given time. The lower region labeled FCS 114 represents the region where the fuel cell system can operate, and the upper region labeled ESS 130 illustrates the region where the energy storage system provides power. Since the fuel cell is tied directly to the energy storage, movement up or down in voltage on the V/I plot is based on the ESS state of charge. The fuel cell system can operate in the lower region, and it is going to move left and right based on air flow (i.e., air utilization). However, by throttling the air down (e.g., increasing utilization), the point on the V/I curve will move horizontally to the left, and the fuel cell can be operated anywhere in the lower region, with the energy storage system making up the difference in power. This can be seen graphically in FIG. 7, where the air flow has been throttled back to near zero (e.g., high utilization), and the state of charge SOC of the energy storage system will make up any difference in power demanded by the traction drive 120. This example may occur at a higher vehicle speed, but while coasting. That is, the ESS energy is used to accelerate to higher speeds, but no power is needed to maintain that speed. The ESS is at a low state of charge and ready to receive braking energy to recharge ESS.

An important aspect of the disclosed system is that the fuel cell air flow system 124 can be utilized in lieu of a DC/DC converter to actively regulate the proportion of current flow (e.g., the power split) between the fuel cell system 114 and the energy storage system 130 to meet the power demand of the electric traction drive 120. The ability to operate the FCS 114 over such a large envelop gives designers the flexibility to remove some of the functions of the DC/DC converter. Instead of the DC/DC converter proportioning the current draw, the fuel cell air flow dictates the split of current flow. This novel method of operation is graphically illustrated in FIGS. 8-11, which depict simulation model outputs from a heavy-duty vehicle transient.

Figure 8:
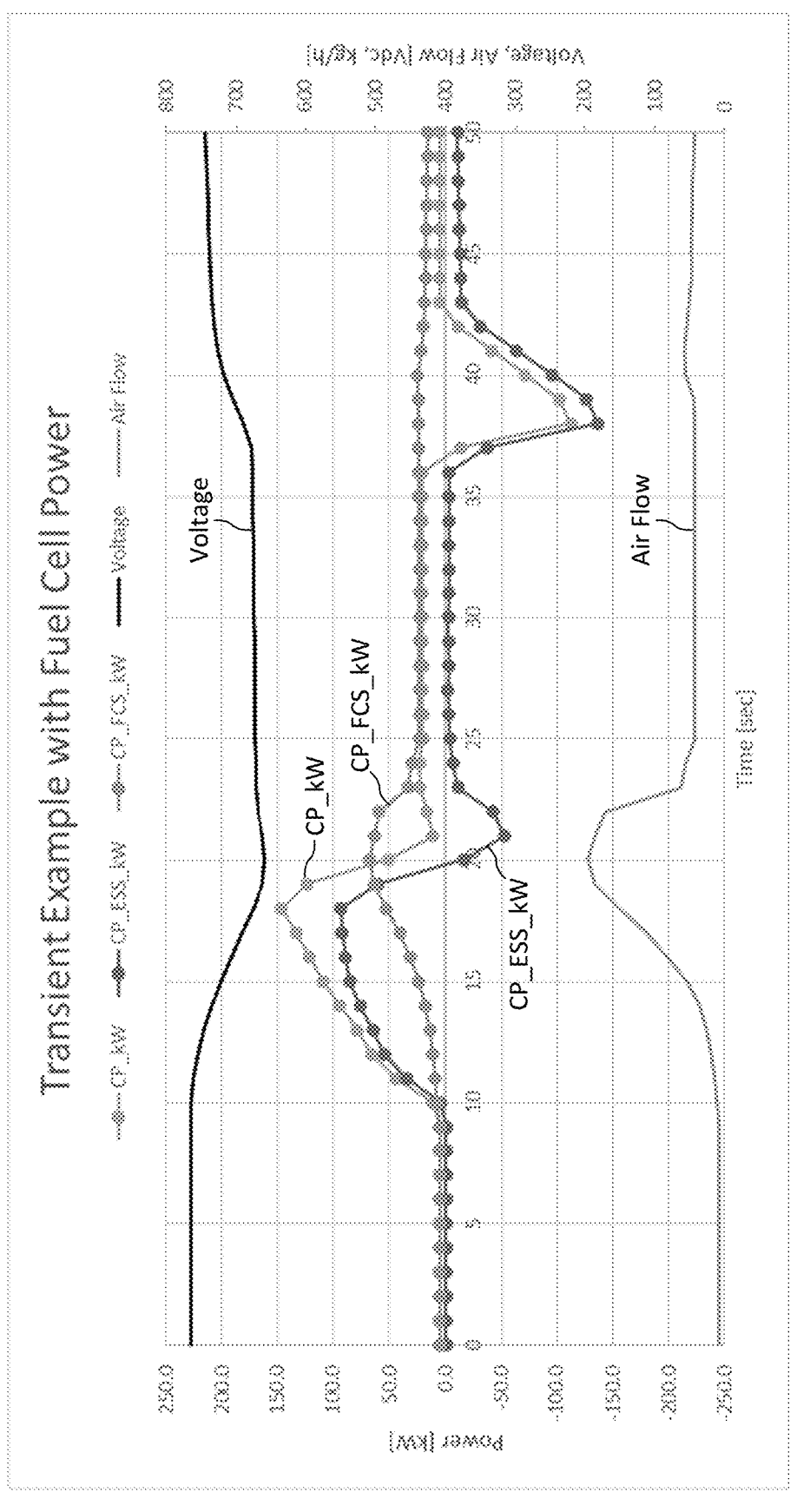
FIG. 8 depicts a graph of a simulated operational transient of a fuel cell power plant in accordance with one embodiment of the present invention.

FIG. 8 depicts a heavy-duty vehicle duty cycle, and illustrates how the fuel cell air flow is utilized to regulate the proportion of current flow between the fuel cell system and the energy storage system. In the simulation, the vehicle accelerates from a stop at 10 seconds, reaches the desired speed of 20 mph at 18 seconds, maintains 20 mph until 36 seconds, then undergoes a braking event, coming to a stop at 43 seconds. The power required at the traction drive (CP_kW) peaks at about 150 KW, levels off to about 25 kW during constant speed, and becomes negative during the braking event as power is pulled into the energy storage system. The power flow out of the energy storage system (CP_ESS_kW) is given a positive value, and the power flow into the energy storage system, indicating a recharge event, is given a negative value. The power output of the fuel cell system (CP_FCS_KW) is depicted along with the air flow provided by the fuel cell air flow system.

During the initial acceleration, the energy storage system (e.g., ultracapacitor) provides almost all the power. Because the power plant is a load following design, as the state of charge depletes in the energy storage system (represented as "Voltage"), more power is required of the fuel cell system and the air flow ramps up to provide the correct amount of air flow to meet the power demand. As the fuel cell system ramps up to meet the full power demand, the proportion of power supplied by the energy storage system decreases to zero.

Note that the fuel cell power ramp up is quite shallow. This illustrates a benefit of the disclosed system—the air flow schedule is configured to operate the fuel cell system at maximum efficiency, and allow the energy storage system to handle the rest. In this manner, the energy storage system dampens or levels out the transients. The fuel cell system's response time to transients is slower than the energy storage system, so in many short-duration transients the fuel cell system does need to respond; the energy storage system will respond.

Figure 9:
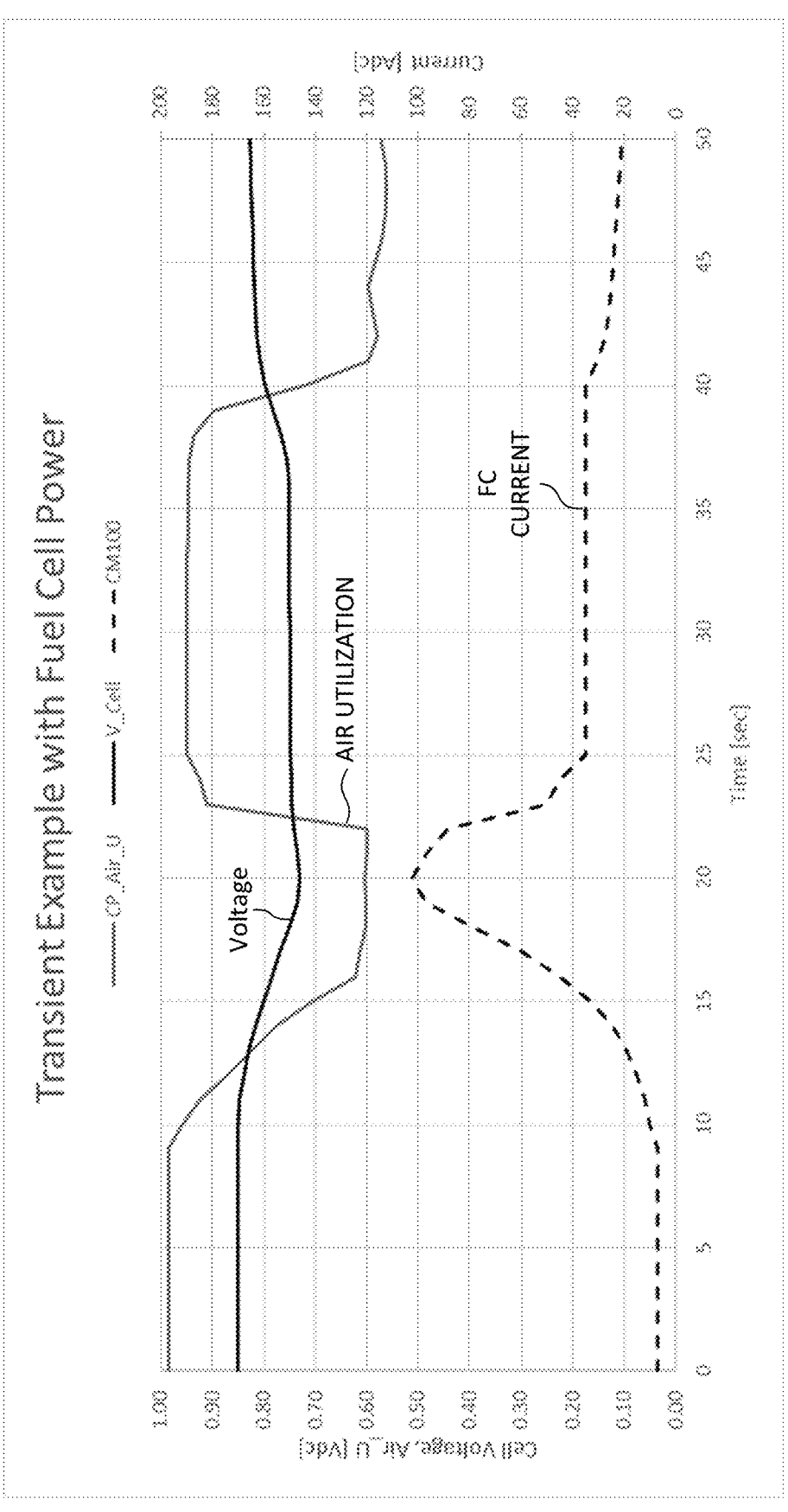
FIG. 9 depicts the graph of FIG. 8 with additional data.

FIG. 9 is an alternate depiction of the transient shown in FIG. 8, in which the fuel cell system is responding to the required power based on air flow control. A DC/DC converter is not present and therefore is not controlling the current split. Rather, the cell stack air flow, shown as air utilization CP_Air_U, is controlling the proportion of current split between the energy storage system and fuel cell system. Note that the voltage curve is identical to FIG. 8. At the start of the transient the state of charge on the ESS is high, and the fuel cell air flow is very low, so the air utilization is very high, about 99%. This condition is represented by the operating point on FIG. 7. In response to the power demand, the state of charge on the ESS decreases and the air flow is increased, as shown by the air utilization dropping to 60%. When the power demand drops off as the vehicle reaches a steady speed, the air utilization increases to drop the fuel cell system current. Otherwise, the fuel cell system would begin charging the ESS, increasing the voltage and state of charge. The disclosed system can keep the ESS state of charge low, to capture as much regeneration as possible. After the braking event, air utilization decreases towards 60% and power is proportioned to the energy storage system to restore the state of charge, as shown by the voltage increase.

Figure 10:
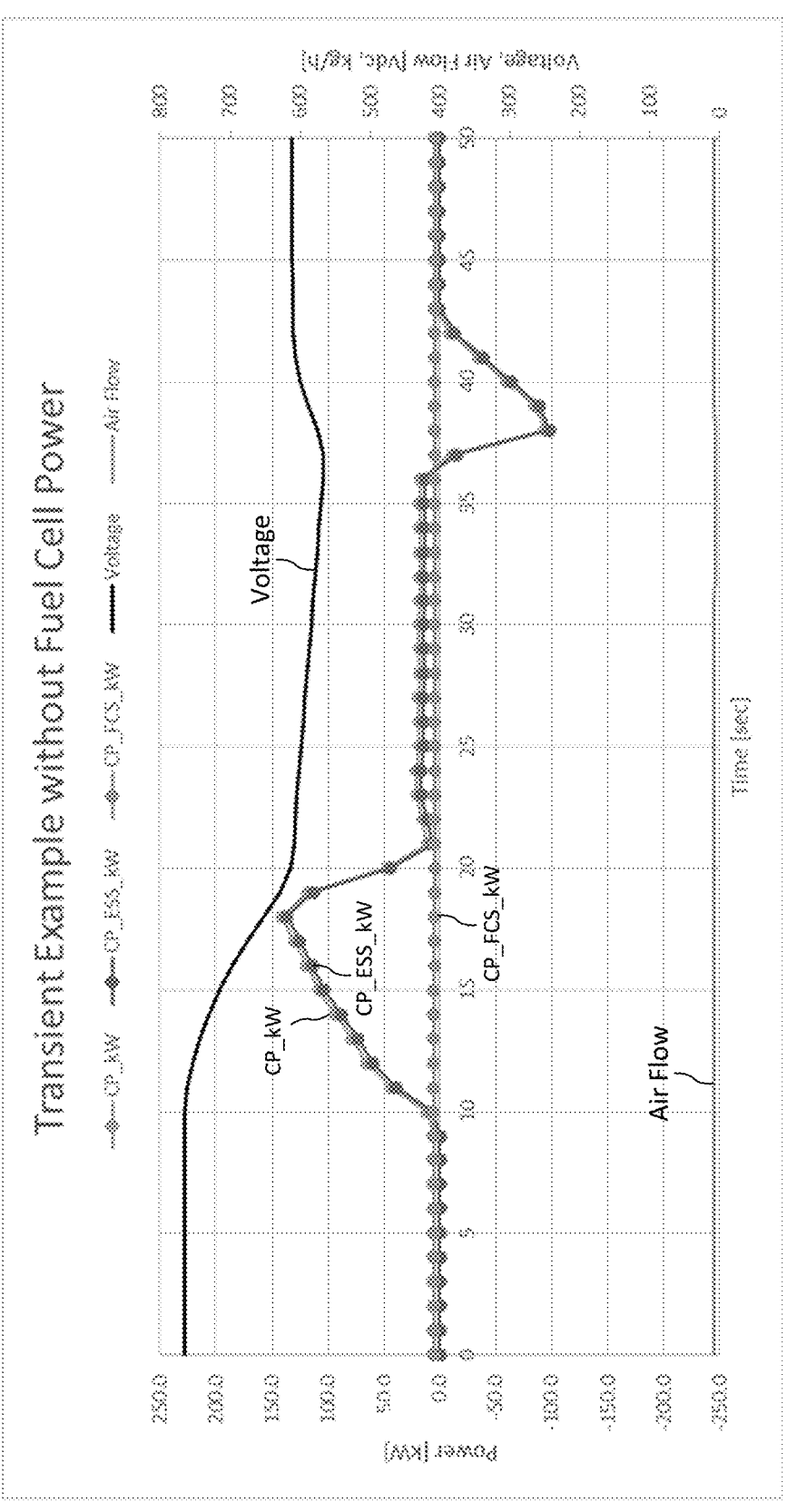
FIG. 10 depicts a graph of a simulated operational transient of the fuel cell power plant of FIG. 8 in accordance with another embodiment of the present invention.

FIG. 10 depicts the same operational transient as FIG. 8, except the air flow has been throttled to a very low value and the fuel cell system provides very little power—the power supplied by the energy storage system essentially tracks the load at the traction drive. The capability to proportion all the power to the energy storage system during a transient is important because it maximizes the system efficiency while meeting the load demand of the vehicle without the use of a DC/DC converter.

Figure 11:
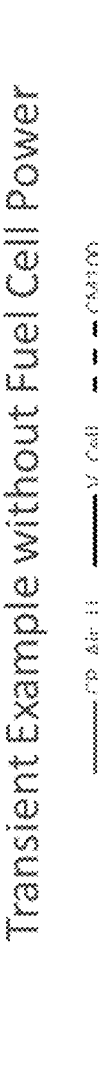
FIG. 11 depicts the graph of FIG. 10 with additional data.
Figure 11:
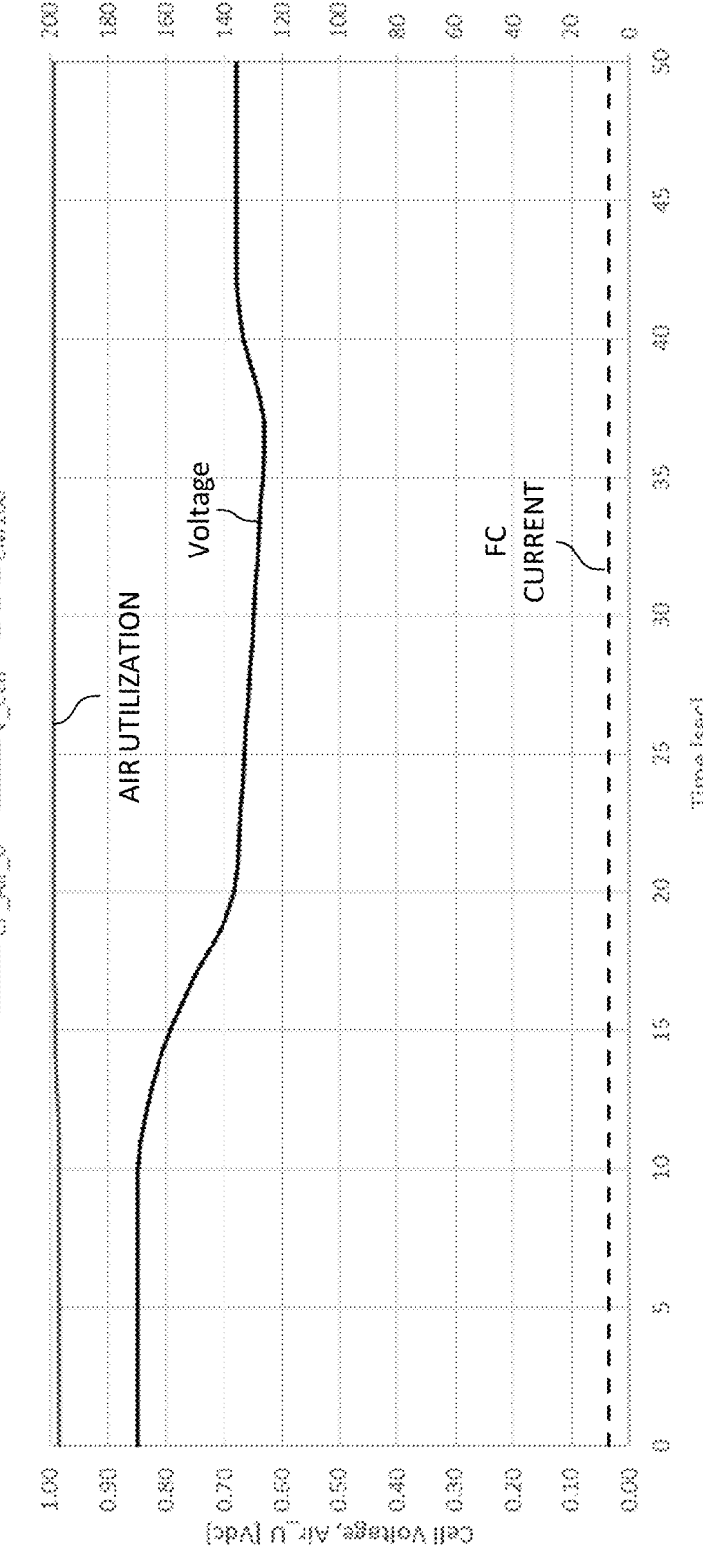

FIG. 11 is an alternate depiction of the transient shown in FIG. 10, showing air utilization, fuel cell current, and cell voltage. Note that the fuel cell current does not increase. The air flow can be modulated to proportion the power split between the fuel cell system and the energy storage system, even when the split is solely to the energy storage system. This load split demonstrates the broad capability of the power plant. At one end of the range, the fuel cell air flow is low and the current to the load is proportioned to energy storage system. At the other end of the range, the fuel cell air flow is modulated to allow the fuel cell to operate at high efficiency, and the balance of power is supplied by the energy storage system. Of course, the air flow can be modulated to proportion the current split anywhere within the range. For example, the air flow may be throttled to level load the fuel cell (while the energy storage system handles the transients) and also to charge the ESS.

The broad operating range of the disclosed power plant is in stark contrast to that of a typical solid plate fuel cell system, which cannot operate in the described manner without a DC/DC converter. Hypothetically, if the DC/DC converter were to be removed from a solid plate system, the operable voltage range of the fuel cell is constrained by the high air flow required (i.e., 60% air utilization) to prevent the membrane and reactant channels from flooding or drying out. During the acceleration phase a load is drawn on the DC-link, and the energy storage system and fuel cell system will share the current because they are at the same voltage. The energy storage system will drop in voltage, so the fuel cell system will also drop in voltage. If the power draw at the DC-link is stopped, the fuel cell system will continue to provide current, but will begin charging the energy storage system, following the V/I curve in the opposite direction.

Since the fuel cell performance will follow the 60% utilization curve on the V/I plot, the fuel cell system can only withstand small changes to the air flow and therefore is not capable of operating continuously in the broad range afforded by the disclosed system.

The benefits of using fuel cell air flow control for power management are not limited to eliminating the DC/DC converter. The integrity of the stack can be protected by applying slower power ramp-ups and ramp-downs without a DC/DC converter. Furthermore, a pre-determined state of charge can be maintained on the energy storage system to optimize power plant performance. For example, a particular state of charge can be based on vehicle speed. At every idle condition, i.e., zero speed, a high state of charge can be maintained, and then is available for maximum usage as the vehicle accelerates. Then, depending on the vehicle speed, the state of charge level may be adjusted such that when a braking event occurs the charge is fully restored. Alternatively, if the traction drive load begins to decrease, the air flow can be increased to charge up the energy storage system.

Figure 12:
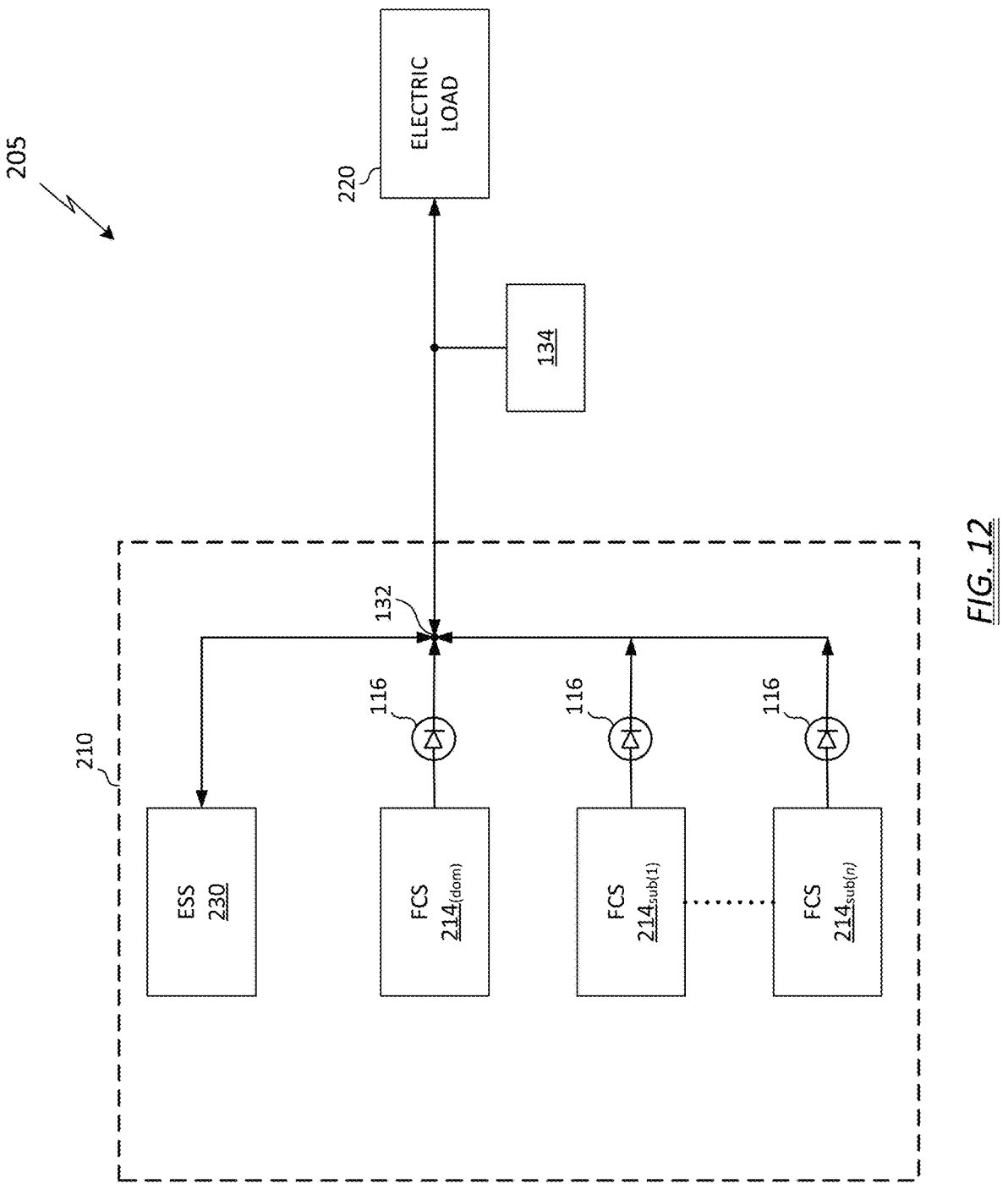
FIG. 12 depicts a block schematic diagram of another embodiment of a fuel cell power plant in accordance with the present invention.

FIG. 12 illustrates another embodiment of the invention, in which a hybrid power system 205 includes a power plant 210 made up of multiple fuel cell systems 214 in parallel with an optional energy storage system 230, connected to an electric load 220. As described with reference to FIG. 2, each fuel cell system 214 includes a fuel cell stack and controller, a fuel flow system, an air flow system, a water management system, and a thermal management system. Power plant 210 may be utilized to proportion current to much larger system loads 220, such as long-haul trucks, freight trains, marine engines, back-up power units, or multi-megawatt stationary applications such as grid backup.

The air flow for each fuel cell system 214 may be independently modulated to proportion the current between them. For example, one or more systems 214 may be operated at partial power or turned off completely. In one embodiment, a first fuel cell system 214$_{dom}$ acts as the dominant system, and the remaining fuel cell systems 214$_{sub}$ $_{(1)}$ to 214$_{sub(n)}$ are subservient to the dominant, taking control commands from the dominant system. A power plant with multiple fuel cell stacks provides the benefits of redundancy, optimizing efficiency, and improving system reliability through fault tolerance. In the event of a stack failure or degraded performance, a fuel cell system can reduce power output or be taken offline and the remaining fuel cell systems can compensate for the loss.

Embodiments of the invention disclosed herein are not limited to a hybrid bipolar plate design. Any design having water management decoupled from the air flow system are contemplated within the scope of the invention. Other examples may include pure porous plate designs (no solid sub-plate), also known as water transport plates, and solid plates having small, perforated holes sufficient to achieve the required bubble pressure. The pore size is determined by the specific fuel cell operating conditions and pressures.

Embodiments described herein referenced application to heavy-duty vehicles, such as Class 8 trucks. However, the claims are not so limiting. The inventors envision certain claimed embodiments may have useful purpose in light-duty vehicles, other kinds of other vehicles, and any application drawing a load from a fuel cell system in parallel with an energy storage system.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than the mentioned certain number of elements. Also, while a number of particular embodiments have been described, it will be understood that features and aspects that have been described with reference to each particular embodiment can be used with each remaining particularly described embodiment.

What is claimed is:

1. A method for operating a hybrid power system, comprising the steps of:

providing a fuel cell power plant operably connected to an electric load, the fuel cell power plant comprising an energy storage system connected in parallel with a fuel cell system, the fuel cell system comprising a fuel flow system, an air flow system including a cathode recycle loop, a water management system, and a controller operable to manage a power demand of the electric load;

sensing parameters and providing sensed data to the controller;

calculating an operational set point responsive to the sensed data to proportion a current split between the fuel cell system and the energy storage system;

throttling the air flow system conjoined with the cathode recycle loop to operate at the operational set point;

actively proportioning the current split between the fuel cell system and the energy storage system in response to throttling the air flow system; and decoupling operation and control of the air flow system from the operation and control of the water management system.

2. The method of claim 1, further comprising the step of receiving and/or delivering the proportioned current flow to meet the power demand from the electric load.

3. The method of claim 1, wherein the hybrid power system is configured for a vehicle and the electric load is a traction drive, and further wherein the step of sensing parameters and providing sensed data to the controller comprises sensing vehicle parameters.

4. The method of claim 3, wherein the step of sensing parameters and providing sensed data to the controller further comprises sensing environmental data.

5. The method of claim 1, wherein the hybrid power system is a stationary system.

6. The method of claim 1, wherein the step of decoupling operation and control of the air flow system from operation and control of the water management system comprises providing a hybrid bipolar plate structure comprising a solid sub-plate and a porous sub-plate.

7. The method of claim 1, wherein the water management system is an internal water management system.

8. The method of claim 1, wherein actively proportioning current flow between the fuel cell system and the energy storage system is carried out in the absence of a DC/DC converter.

9. The method of claim 1, wherein a fuel cell output current in the fuel cell system is characterized by a family of V/I performance curves at different air utilizations, and the step of throttling the air flow system conjoined with the cathode recycle loop comprises increasing or decreasing air utilization to move between the family of V/I performance curves.

10. The method of claim 9, wherein increasing or decreasing air utilization comprises operating within a range from 40% to 99% fuel cell air utilization.

11. The method of claim 9, wherein increasing or decreasing air utilization comprises operating within a range from 40% to 55% fuel cell air utilization.

12. The method of claim 9, wherein increasing or decreasing air utilization comprises operating within a range from 65% to 99% fuel cell air utilization.

13. The method of claim 1, wherein the fuel cell power plant further comprises an isolated thermal management system, and the method for operating the hybrid power system further includes a step of controlling a temperature of the fuel cell system with the thermal management system.

\* \* \* \* \*